US012714105B2

(12) United States Patent
Macom et al.

(10) Patent No.: US 12,714,105 B2
(45) Date of Patent: Aug. 25, 2026

(54) HERBICIDAL MIXTURES AND COMPOSITIONS AND METHODS OF USE

(71) Applicant: SBM DEVELOPPEMENT SAS, Ecully (FR)

(72) Inventors: Thomas Eli Macom, Holly Springs, NC (US); Robert Britt Baker, Cary, NC (US); Gary Gore, Four Oaks, NC (US)

(73) Assignee: SBM Développement SAS, Écully (FR)

( * ) Notice: Subject to any disclaimer, the term of this patent is extended or adjusted under 35 U.S.C. 154(b) by 583 days.

(21) Appl. No.: 18/001,091

(22) PCT Filed: Jun. 8, 2021

(86) PCT No.: PCT/US2021/036318

§ 371 (c)(1),
(2) Date: Dec. 8, 2022

(87) PCT Pub. No.: WO2021/252438

PCT Pub. Date: Dec. 16, 2021

(65) Prior Publication Data

US 2023/0210111 A1 Jul. 6, 2023

Related U.S. Application Data

(60) Provisional application No. 63/036,721, filed on Jun. 9, 2020.

(51) Int. Cl.

| | |
|---|---|
| ***A01N 37/38*** | (2006.01) |
| ***A01N 37/40*** | (2006.01) |
| ***A01N 39/02*** | (2006.01) |
| ***A01N 39/04*** | (2006.01) |
| ***A01N 43/40*** | (2006.01) |
| ***A01N 43/80*** | (2006.01) |
| ***A01P 13/00*** | (2006.01) |

(52) U.S. Cl.
CPC ............ *A01N 37/38* (2013.01); *A01N 37/40* (2013.01); *A01N 39/02* (2013.01); *A01N 39/04* (2013.01); *A01N 43/40* (2013.01); *A01N 43/80* (2013.01); *A01P 13/00* (2021.08)

(58) Field of Classification Search
CPC ........ A01N 37/38; A01N 37/40; A01N 43/40; A01N 43/80; A01N 39/02; A01N 39/04; A01P 13/00
See application file for complete search history.

(56) References Cited

U.S. PATENT DOCUMENTS

| | | | | |
|---|---|---|---|---|
| 6,602,823 | B1 | 8/2003 | Roechling et al. | |
| 6,713,433 | B2 | 3/2004 | Jimoh | |
| 8,609,935 | B2 | 12/2013 | Kinney et al. | |
| 9,060,516 | B2 | 6/2015 | Zawierucha et al. | |
| 2004/0102320 | A1* | 5/2004 | Grimm | A01N 59/04 504/117 |
| 2012/0088670 | A1 | 4/2012 | Wells | |
| 2015/0105254 | A1 | 4/2015 | Li | |
| 2016/0165898 | A1 | 6/2016 | Mathers et al. | |
| 2017/0295790 | A1 | 10/2017 | Spesard et al. | |
| 2018/0007891 | A1 | 1/2018 | Leatherwood et al. | |

OTHER PUBLICATIONS

International Search Report and the Written Opinion of the International Searching Authority corresponding to International Patent Application No. PCT/US2021/036318 mailed Sep. 22, 2021 (10 pages).

* cited by examiner

*Primary Examiner* — Sahana S Kaup
*Assistant Examiner* — Andriae M Holt
(74) *Attorney, Agent, or Firm* — Myers Bigel, P.A.

(57) ABSTRACT

The invention relates to herbicidal mixtures and compositions comprising isoxaben, dithiopyr, 2,4-Dichlorophenoxyacetic acid (2,4-D), 3,6-dichloro-2-methoxybenzoic acid (dicamba) and methylchlorophenoxypropionic acid (Mecoprop or MCPP), and methods of using the same.

20 Claims, 2 Drawing Sheets

HERBICIDAL MIXTURES AND COMPOSITIONS AND METHODS OF USE

STATEMENT OF PRIORITY

This application claims the benefit, under 35 U.S.C. § 119(e), of U.S. Provisional Application No. 63/036,721 filed on Jun. 9, 2020, the entire contents of which is incorporated by reference herein.

FIELD OF THE INVENTION

The invention relates to herbicidal mixtures and compositions comprising isoxaben, dithiopyr, 2,4-Dichlorophenoxyacetic acid (2,4-D), 3,6-dichloro-2-methoxybenzoic acid (dicamba) and methylchlorophenoxypropionic acid (Mecoprop or MCPP), and methods of using the same.

BACKGROUND OF THE INVENTION

Herbicides containing dicamba, 2,40D and MCPP are commonly used in residential, agricultural, recreational, and industrial settings for the control of weeds. However, there is a need to reduce the amounts of these compounds present in standard herbicidal mixtures while retaining the same or increasing the efficacy in controlling weeds. The present invention addresses these needs by providing a novel formulation using isoxaben and dithiopyr that provides pre-emergent control of weeds.

SUMMARY OF THE INVENTION

One aspect of the invention provides an herbicidal mixture comprising: isoxaben, dithiopyr, 2,4-Dichlorophenoxyacetic acid (2,4-D) and/or an ester, salt and/or choline thereof, 3,6-dichloro-2-methoxybenzoic acid (dicamba) and/or an ester and/or salt thereof, and methylchlorophenoxypropionic acid (Mecoprop or MCPP) and/or an ester and/or salt thereof.

A second aspect of the invention provides a method of controlling plant growth comprising contacting a plant, plant part and/or a plant environment with an effective amount of an herbicidal mixture of the present invention.

A third aspect of the invention provides a method of controlling undesirable plant growth in turf comprising contacting an undesired plant, plant part, and/or plant environment with an effective amount of the herbicidal mixture of the invention.

A third aspect provides a method of controlling seed germination comprising contacting a plant environment with an effective amount of the herbicidal mixture of the invention.

Further provided is a method of controlling seed germination in turf comprising contacting a plant environment (e.g., the turf) with an effective amount of the herbicidal mixture of the invention.

These and other aspects of the invention are set forth in more detail in the description of the invention below.

DETAILED DESCRIPTION

Figure 1:
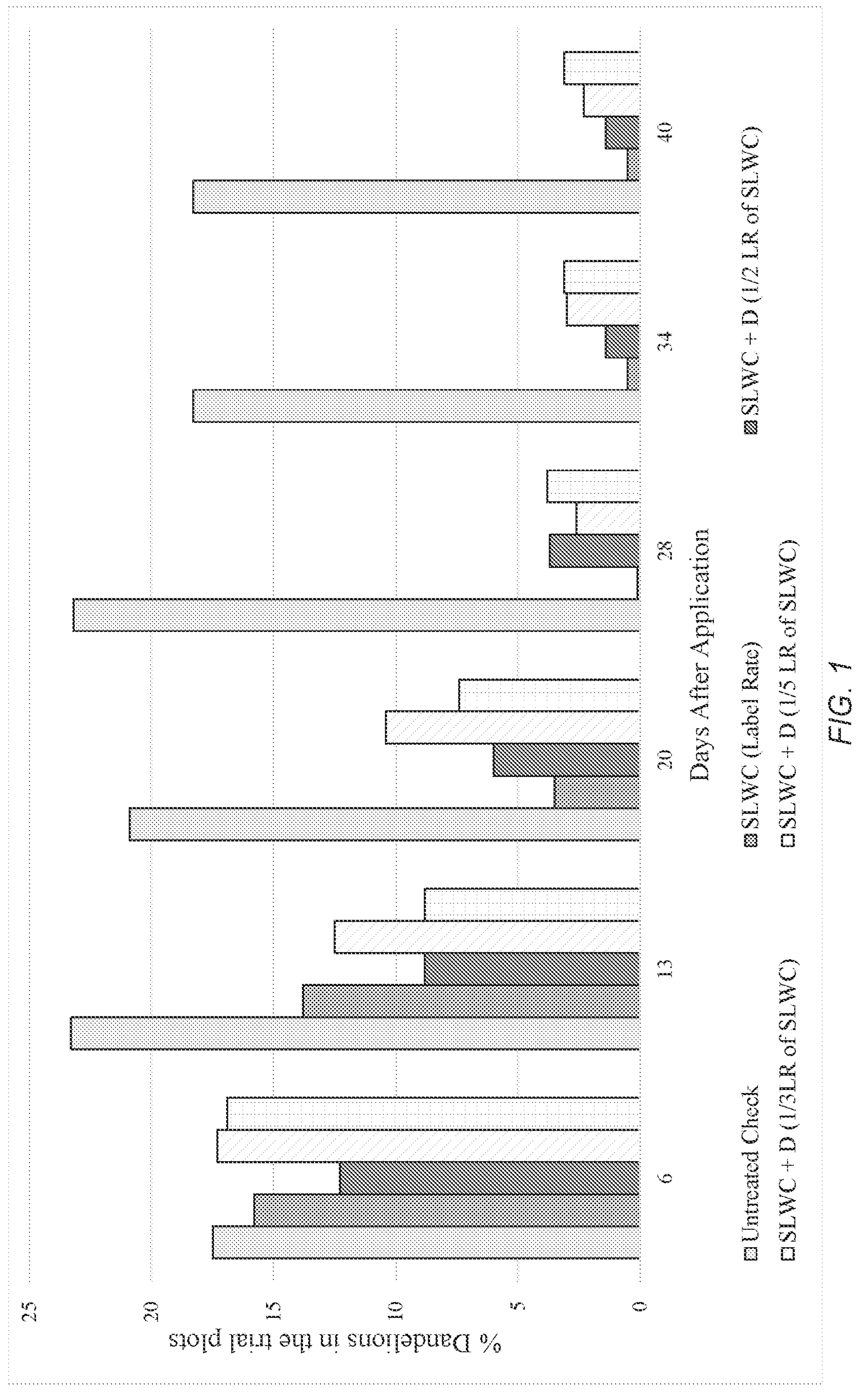
FIG. 1 shows post-emergent control of dandelions with BioAdvance Season Long Weed Control (SLWC) and different formulations of the invention comprising dithiopyr, isoxaben, 2,4-D, dicamba and MCPP (e.g., SLWC (at the labeled rate (LR) and ⅕, ⅓ and ½ the labeled rate)+dithiopyr (D)

The present invention now will be described hereinafter with reference to the accompanying drawings and examples, in which embodiments of the invention are shown. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

The term "about," as used herein when referring to a measurable value such as an amount or concentration and the like, is meant to encompass variations of ±10%, ±5%, 1%, ±0.5%, or even ±0.1% of the specified value as well as the specified value. For example, "about X" where X is the measurable value, is meant to include X as well as variations of ±10%, ±5%, ±1%, ±0.5%, or even ±0.1% of X.

A range provided herein for a measureable value may include any other range and/or individual value therein.

Thus, a recitation of ranges of values herein are merely intended to serve as a shorthand method of referring individually to each separate value falling within the range, unless otherwise indicated herein, and each separate value is incorporated into the specification as if it were individually recited herein. For example, if the range 10 to 15 is disclosed, then 11, 12, 13, and 14 are also disclosed, as well as the ranges of 10 to 13, 11 to 14, etc.

As used herein, phrases such as "between X and Y" and "between about X and Y" should be interpreted to include X and Y. As used herein, phrases such as "between about X and Y" mean "between about X and about Y" and phrases such as "from about X to Y" mean "from about X to about Y."

The term "comprise," "comprises" and "comprising" as used herein, specify the presence of the stated features, integers, steps, operations, elements, and/or components, but do not preclude the presence or addition of one or more other features, integers, steps, operations, elements, components, and/or groups thereof.

As used herein, the transitional phrase "consisting essentially of" means that the scope of a claim is to be interpreted to encompass the specified materials or steps recited in the claim and those that do not materially affect the basic and novel characteristic(s) of the claimed invention. Thus, the term "consisting essentially of" when used in a claim of this invention is not intended to be interpreted to be equivalent to "comprising."

As used herein, the terms "increase," "increasing," "increased," "enhance," "enhanced," "enhancing," and "enhancement" (and grammatical variations thereof) describe an elevation of at least about 5%, 10%, 15%, 20%, 25%, 50%, 75%, 100%, 150%, 200%, 300%, 400%, 500% or more as compared to a control.

As used herein, the terms "reduce," "reduced," "reducing," "reduction," "diminish," and "decrease" (and grammatical variations thereof), describe, for example, a decrease of at least about 5%, 10%, 15%, 20%, 25%, 35%, 50%, 75%, 80%, 85%, 90%, 95%, 97%, 98%, 99%, or 100% as compared to a control. In particular embodiments, the reduction can result in no or essentially no (i.e., an insignificant amount, e.g., less than about 10% or even 5%) detectable activity or amount.

"Alkyl" as used herein alone or as part of another group, refers to a straight or branched chain hydrocarbon containing from 1 to 20 carbon atoms, 1 to 10 carbons, or 1 to 6 carbons, which can be referred to as a C1-C20 alkyl, C1-C10 alkyl or C1-C6 alkyl. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl, and the like. "Loweralkyl" as used herein, is a subset of alkyl, and, in some embodiments, refers to a straight or branched chain hydrocarbon group containing from 1 to 4 carbon atoms. Representative examples of loweralkyl include, but are not limited to, methyl, ethyl, n-propyl, iso-propyl, n-butyl, iso-butyl, tert-butyl, and the like. The term "alkyl" or "loweralkyl" is intended to include both substituted and unsubstituted alkyl or loweralkyl unless otherwise indicated and these groups may be substituted with groups selected from halo, alkyl, haloalkyl, alkenyl, alkynyl, cycloalkyl, cycloalkylalkyl, aryl, arylalkyl, heterocyclo, heterocycloalkyl, hydroxyl, alkoxy (thereby creating a polyalkoxy such as polyethylene glycol), alkenyloxy, alkynyloxy, haloalkoxy, cycloalkoxy, cycloalkylalkyloxy, aryloxy, arylalkyloxy, heterocyclooxy, heterocycloalkyloxy, mercapto, alkyl-$S(O)_m$, haloalkyl-$S(O)_m$, alkenyl-$S(O)_m$, alkynyl-$S(O)_m$, cycloalkyl-$S(O)_m$, cycloalkylalkyl-$S(O)_m$, aryl-$S(O)_m$, arylalkyl-$S(O)_m$, heterocyclo-$S(O)_m$, heterocycloalkyl-$S(O)_m$, amino, carboxy, alkylamino, alkenylamino, alkynylamino, haloalkylamino, cycloalkylamino, cycloalkylalkylamino, arylamino, arylalkylamino, heterocycloamino, heterocycloalkylamino, disubstituted-amino, acylamino, acyloxy, ester, amide, sulfonamide, urea, alkoxyacylamino, aminoacyloxy, nitro or cyano where m=0, 1, 2 or 3.

"Alkoxy" as used herein alone or as part of another group, refers to an alkyl or loweralkyl group, as defined herein (and thus including substituted versions such as polyalkoxy), appended to the parent molecular moiety through an oxy group, —O—. Representative examples of alkoxy include, but are not limited to, methoxy, ethoxy, propoxy, 2-propoxy, butoxy, tert-butoxy, pentyloxy, hexyloxy and the like.

"Alkoxyalkyl" as used herein alone or as part of another group, refers to an alkyl or loweralkyl group, as defined herein (and thus including substituted versions such as polyalkoxy), appended to another alkyl or loweralkyl group through an oxy group, —O—, such as, but not limited to, $—CH_2CH_2OCH_2CH_2CH_3$.

As used herein, the term "plant part" refers to at least a fragment of a whole plant. Mixtures and compositions of the present invention may be applied to or contacted with any suitable plant part, including, but not limited to, anthers, branches, buds, calli, clumps, cobs, cotyledons, ears, embryos, filaments, flowers, fruits, husks, kernels, leaves, lodicules, ovaries, palea, panicles, pedicels, pods, pollen, protoplasts, roots, root tips, seeds, silks, stalks, stems, stigma, styles, and tassels.

As used herein, a "plant environment" is any area where a plant or plant part may be found and for which control of the plant or plant part is desirable. Non-limiting examples of a plant environment may include soil or a substrate (synthetic or natural) in which a plant or plant part may be found. In some embodiments, the plant environment may be contacted with the mixtures and/or compositions of the invention in the presence of a plant or plant part. In some embodiments, a plant environment may be contacted with the mixtures and/or compositions of the invention concurrently with contacting a plant or plant part present in the plant environment. In some embodiments, a plant environment may be contacted with the mixtures and/or compositions of the invention prior to the presence of a plant or plant part, e.g., in the absence of a plant or plant part. Thus, in some embodiments, control of plant growth may be observed when the plant environment only is contacted/treated with the mixtures and/or compositions of the invention (e.g., reducing growth of plants and/or plant parts that are later introduced into the plant environment).

As used herein, "control of growth" means reducing the growth of a plant or a plant part, and can include death of the plant or plant part. Control of growth may include, but is not limited to, reducing growth of a plant or plant part over time, and/or producing observable plant and/or plant part phytotoxicity, and/or a more rapid observable phytotoxicity to the plant and/or plant part. Control of growth may also include, but is not limited to, residual control (and/or increased residual control) of a plant and/or plant part, reducing seed germination and/or reducing seed germination over time.

As used herein, the term "observable phytotoxicity" refers to observable phenotypes of decline of a plant and/or plant part, following contact with a mixture or composition of the present invention, and includes, but is not limited to, such phenotypic characteristics as dehydration, wilting, leaf curling, discoloration (e.g., chlorosis, browning, and the like), and necrosis. "Discoloration" may include any change in color from the natural color of the tissue prior to application of a composition or mixture of the invention. Thus, discoloration can include, but is not limited to, yellowing (e.g., chlorosis) and browning. A phenotype can be observable to the naked eye, or by any other means of evaluation known in the art, e.g., microscopy, biochemical analysis, or an electromechanical assay.

As used herein, the term "residual control" is defined as control of regrowth/re-emergence, seed germination, and/or plant migration (by runners, roots, seeds or other plant propagules (e.g., stolons, tubers, rhizomes and/or bulbs and the like; i.e., any structure from which a plant can arise)) into treatment area from outside of treatment area.

The present inventors have surprisingly discovered that the amount of 2,4-D, the amount of dicamba and the amount of MCPP present in an herbicidal mixture may be reduced by at least 40% when the 2,4-D (in the form of an acid, ester, salt and/or choline, or any combination thereof), dicamba (in the form of an acid, an ester, or salt, or any combination thereof) and MCPP (in the form of an acid, ester, salt and/or or any combination thereof) is combined in an herbicidal mixture with isoxaben and dithiopyr but yet achieve the same or increased efficacy over standard mixtures comprising dicamba, 2,4-D and MCPP.

In some embodiments, the herbicidal effect that is observed includes but is not limited to, for example, control or increased control of growth of a plant and/or plant part; control or increased control of growth of a plant and/or plant part over time; increased rate of observable plant and/or plant part phytotoxicity; reduced time to observable phytotoxicity; increased residual control of a plant and/or plant part, reduced seed germination and/or reduced seed germination over time (e.g., residual control of seed germination) as compared to a control (e.g., a plant, plant part and/or plant environment contacted with an herbicidal mixture comprising dicamba, 2,4-D and MCPP at the standard amounts or rates in standard herbicidal mixtures and without isoxaben and dithiopyr or with an herbicidal mixture comprising the same amount of dicamba, 2,4-D and MCPP present in the herbicidal mixtures of the invention but in the absence of the isoxaben and dithiopyr).

In some embodiments, the present invention provides an herbicidal mixture comprising, consisting essentially of, or consisting of: isoxaben; dithiopyr; 2,4-Dichlorophenoxyacetic acid (2,4-D) and/or an ester, salt and/or choline thereof; 3,6-dichloro-2-methoxybenzoic acid (dicamba) and/or ester and/or a salt thereof; and methylchlorophenoxypropionic acid (Mecoprop or MCPP) and/or an ester and/or salt thereof.

Isoxaben (also known as GALLERY®, e.g., Gallery 75 DF) useful for mixtures and compositions of the invention may be any form of isoxaben known in the art for use in herbicidal formulations.

A non-limiting example of a structure of isoxaben includes:

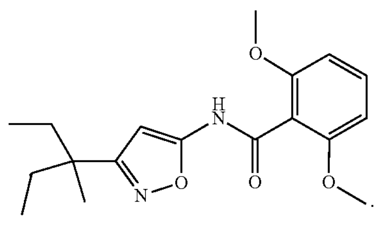 [SMILES: CCC(C)(c1cc(NC(=O)c2c(OC)cccc2OC)on1)C(C)C]

Dithiopyr (Dimethyl 2-(difluoromethyl)-4-(2-methylpropyl)-6-(trifluoromethyl)pyridine-3,5-dicarbothioate) useful for the mixtures and compositions of the invention may be any form of dithiopyr known in the art for use in herbicidal formulations. A non-limiting example of a structure of dithiopyr includes:

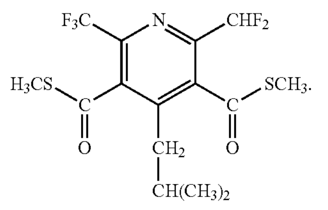

2, 4-D (2,4-Dichlorophenoxyacetic acid) useful with the mixtures and composition of the invention may be in the form of an acid, an ester, a salt and/or a choline in any combination thereof.

Non-limiting examples of structures of 2,4-D include:

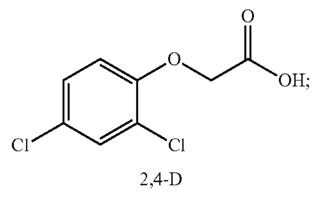

2,4-D

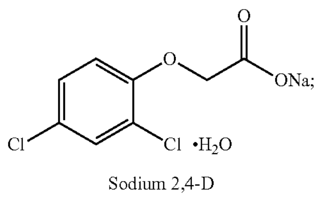

Sodium 2,4-D

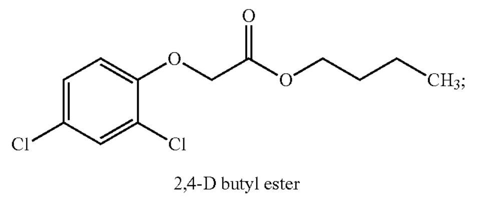

2,4-D butyl ester

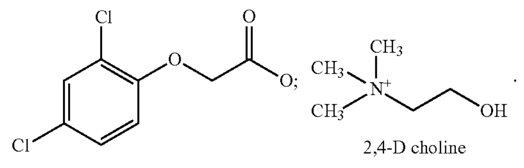

2,4-D choline 3,6-dichloro-2-m-ethoxybenzoic acid (dicamba) useful with the mixtures and composition of the invention may be in the form of an acid, an ester, or a salt in any combination thereof.

Non-limiting examples of structures for dicamba include:

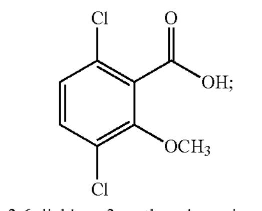

3,6-dichloro-2-methoxybenzoic acid (dicamba)

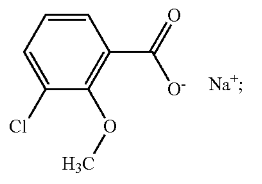

Sodium dicamba

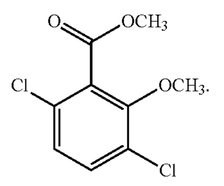

Dicamba methyl ester

Methylchlorophenoxypropionic acid (Mecoprop or MCPP) useful with the mixtures and composition of the invention may be in the form of an acid, ester or salt in any combination thereof.

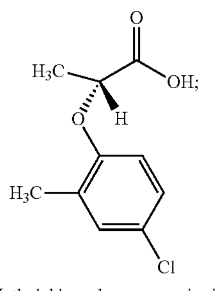

Methylchlorophenoxypropionic acid (Mecoprop or MCPP)

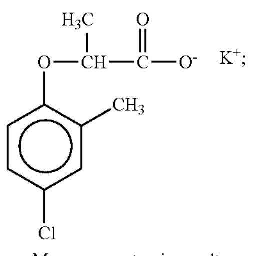

Mecoprop potassium salt

-continued

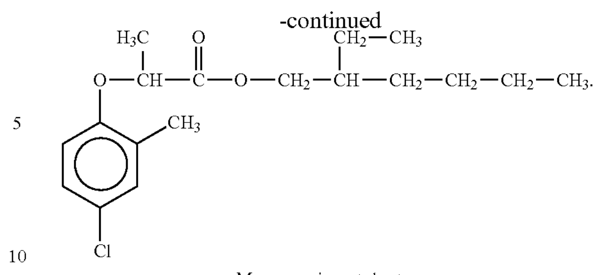

Mecoprop isooctyl ester

In some embodiments, an herbicidal mixture and/or composition of the invention may comprise isoxaben in an amount of about 0.02% weight/volume (w/v) to about 25% w/v of the mixture and/or composition, e.g., about 0.02, 0.03, 0.04, 0.05, 0.10, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v, or any range or value therein. In some embodiments, the amount of isoxaben in the herbicidal mixture may be in a range of about 0.02 to about 0.5% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.06, 0.07, 0.08, 0.09, 0.1, 0.15, 0.2, 0.25, 0.3, 0.35, 0.4, 0.45, or 0.5% w/v). In some embodiments, the amount of isoxaben may be in a range of about 0.02 to about 0.05% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, or 0.05% w/v). In some embodiments, the herbicidal mixture may comprise an amount of isoxaben of about 0.02%-0.04% w/v, optionally about 0.03%-0.04% w/v, (e.g., about 0.03, 0.031, 0.032, 0.033, 0.034, 0.035, 0.036, 0.037, 0.038, 0.039, 0.04% w/v) or about 0.033% w/v. In some embodiments, the herbicide mixture may be provided in a concentrated form and the amount of isoxaben in the concentrate may be in a range of about 1% to about 25% w/v (e.g., about, and/or any range or value therein.

In some embodiments, an herbicidal mixture and/or composition of the invention may comprise dithiopyr in an amount of about 0.02% weight/volume (w/v) to about 25% w/v of the mixture and/or composition, e.g., about 0.02, 0.03, 0.04, 0.05, 0.06, 0.07, 0.08, 0.09, 0.10, 0.2, 0.3, 0.4, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v, or any range or value therein. In some embodiments, the amount of dithiopyr in the herbicidal mixture may be in a range of about 0.02 to about 0.5% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.06, 0.07, 0.08, 0.09, 0.1, 0.15, 0.2, 0.25, 0.3, 0.35, 0.4, 0.45, or 0.5% w/v). In some embodiments, the amount of dithiopyr in an herbicidal mixture of the invention may be in a range of about 0.02 to about 0.05% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, or 0.05% w/v). In some embodiments, the herbicidal mixture may comprise an amount of dithiopyr of about 0.03-0.04% w/v, optionally about 0.03-0.03% w/v, about 0.033-0.035%, or about 0.0342% w/v. In some embodiments, the herbicide mixture may be provided in a concentrated form and the amount of dithiopyr in the concentrate may be in a range of about 1% to about 25% w/v, and/or any range or value therein (e.g., 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v).

In some embodiments, an herbicidal mixture and/or composition of the invention may comprise 2,4-D in an amount of about 0.01% weight/volume (w/v) to about 35% w/v of the mixture and/or composition, e.g., about 0.01, 0.02, 0.03, 0.04, 0.05, 0.10, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 26, 26.5, 27, 27.5, 28, 28.5, 29, 29.5, 30, 30.5, 31, 31.5, 32, 32.5, 33, 33.5, 34, 34.5, or 35% w/v, or any range or value therein. In some embodiments, the amount of 2,4-D in the herbicidal mixture may be in a range of about 0.01 to about 0.1% w/v or any range or value therein, of the mixture and/or composition (e.g., about 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.0491, 0.0492, 0.0493, 0.0494, 0.0495, 0.0496, 0.0497, 0.0498, 0.0499, 0.05, 0.055, 0.06, 0.065, 0.07, 0.075, 0.08, 0.085, 0.09, 0.095 or 0.1% w/v). In some embodiments, the herbicidal mixture may comprise an amount of 2,4-D of about 0.03%-0.06% w/v, optionally about 0.03%-0.05% w/v, about 0.045%-0.05% w/v, or about 0.0493% w/v. In some embodiments, the herbicide mixture may be provided in a concentrated form and the amount of 2,4-D in the concentrate may be in a range of about 1% to about 35% w/v, and/or any range or value therein (e.g., 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 26, 26.5, 27, 27.5, 28, 28.5, 29, 29.5, 30, 30.5, 31, 31.5, 32, 32.5, 33, 33.5, 34, 34.5, or 35% w/v).

In some embodiments, an herbicidal mixture and/or composition of the invention may comprise dicamba (as an acid, ester, or salt, in any combination) in an amount of about 0.001% weight/volume (w/v) to about 20% w/v of the mixture and/or composition, e.g., about 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01, 0.02, 0.03, 0.04, 0.05, 0.06, 0.07, 0.08, 0.09, 0.10, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20% w/v, or any range or value therein. In some embodiments, the amount of dicamba in the herbicidal mixture may be in a range of about 0.001 to about 0.01% w/v or any range or value therein, of the mixture and/or composition (e.g., about 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01 w/v). In some embodiments, the herbicidal mixture may comprise an amount of dicamba of about 0.004-0.01 w/v, optionally about 0.005-0.008 w/v, about 0.005-0.006 w/v, or about 0.0055 w/v. In some embodiments, the herbicide mixture may be provided in a concentrated form and the amount of dicamba in the concentrate may be in a range of about 1% to about 20% w/v, and/or any range or value therein (e.g., 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20% w/v).

In some embodiments, an herbicidal mixture and/or composition of the invention may comprise MCPP in an amount of about 0.005% weight/volume (w/v) to about 20% w/v of the mixture and/or composition, e.g., about 0.005, 0.0055, 0.006, 0.0065, 0.007, 0.0075, 0.008, 0.0085, 0.009, 0.0095, 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.055, 0.06, 0.065, 0.07, 0.075, 0.08, 0.085, 0.09, 0.095, 0.10, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20% w/v, or any range or value therein. In some embodiments, the amount of MCPP in the herbicidal mixture may be in a range of about 0.005 to about 0.05% w/v or any range or value therein, of the mixture and/or composition (e.g., about 0.005, 0.0055, 0.006, 0.0065, 0.007, 0.0075, 0.008, 0.0085, 0.009, 0.0095, 0.01, 0.011, 0.0115, 0.0116, 0.0117, 0.0118, 0.0119, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05% w/v). In some embodiments, the herbicidal mixture may comprise an amount of MCPP of about 0.005-0.05 w/v, optionally about 0.005-0.02% w/v, about 0.01-0.02% w/v, about 0.0115 to 0.012% w/v, or about 0.0118% w/v. In some embodiments, the herbicide mixture may be provided in a concentrated form and the amount of MCPP in the concentrate may be in a range of about 1% to about 20% w/v, and/or any range or value therein (e.g., 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5 or 20% w/v).

An herbicidal mixture and/or composition of the invention may be provided in any formulation useful for application to/contact with a plant, plant part, and/or a plant environment (e.g., an area where the plant is present, e.g., a plant substrate (synthetic or natural), e.g., a soil) for control of plant growth (e.g. weed control). In some embodiments, an herbicidal mixture and/or composition may be in the form of a liquid or a solid (e.g., a spray, an aqueous solution, a non-aqueous solution, a suspension, an emulsion (e.g., in oil (vegetable or mineral)), a flowable mixture, a slurry, a powder, a particle, a granule, a mist, an aerosol, a foam, and/or any combination thereof. In some embodiments, the herbicidal mixture and/or composition is not in a granular form (e.g., the herbicidal mixture and/or composition is not a granular formulation).

In some embodiments, an herbicidal mixture and/or composition of the invention may be provided in a "ready-to-use" formulation and/or in a concentrated formulation to be diluted prior to application to a plant, plant part, and/or plant environment. In some embodiments, a concentrated formulation of a mixture or composition of the invention may comprise isoxaben in an amount in a range of about 1% to about 25% w/v of the mixture and/or composition, e.g., about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v, or any range or value therein, of the mixture and/or composition. Thus, in some embodiments, the amount of isoxaben in a concentrated formulation may be in a range of about 1% to about 5%, about 1% to about 10%, about 5% to about 25%, about 10% to about 20%, about 15% to about 20%, about 10% to about 25%, or about 15% to about 25% w/v, or any range or value therein, of the mixture and/or composition. In some embodiments, the amount of isoxaben in a concentrated formulation may be about 1, 2, 3, 4, 5% to about 6, 7, 8, 9, or 10% w/v or any range or value therein of the mixture and/or composition. In some embodiments, the amount of isoxaben in a concentrated formulation may be about 1, 2, 3% to about 4, or 5% w/v, or any range or value therein, of the mixture and/or composition. In some embodiments, the amount of isoxaben in a concentrated formulation may be about 2% to about 3% w/v, or any range or value therein, of the mixture and/or composition, optionally about 2.5% to about 3% (e.g., 2.5, 2.6, 2.7, 2.8, 2.9, 3%) or about 2.8% to 2.9% (e.g., 2.801, 2.802, 2.803, 2.804, 2.805, 2.806, 2.807, 2.808, 2.809, 2.81, 2.82, 2.83, 2.84, 2.85, 2.86, 2.87, 2.88, 2.89, or 2.9%) of the mixture and/or composition.

In some embodiments, a concentrated formulation of a mixture and/or composition of the invention may comprise dithiopyr in an amount in a range of about 1% to about 25% w/v of the mixture and/or composition, e.g., about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v, or any range or value therein, of the mixture and/or composition. Thus, in some embodiments, the amount of dithiopyr in a concentrated formulation may be in a range of about 1% to about 5%, about 1% to about 10%, about 5% to about 25%, about 10% to about 20%, about 15% to about 20%, about 10% to about 25%, or about 15% to about 25% w/v, or any range or value therein, of the mixture and/or composition. In some embodiments, the amount of dithiopyr in a concentrated formulation may be about 1, 2, 3, 4, 5% to about 6, 7, 8, 9, or 10% w/v, or any range or value therein, of the mixture and/or composition. In some embodiments, the amount of dithiopyr in a concentrated formulation may be about 1, 2, 3% to about 4, or 5% w/v, or any range or value therein, of the mixture and/or composition. In some embodiments, the amount of dithiopyr in a concentrated formulation may be about 2.5% to about 4% (e.g., 2.5, 2.6, 2.7, 2.8, 2.9, 3.1, 3.2, 3.3, 3.4, 3.5, 3.6, 3.7, 3.8, 3.9, or 4%), optionally about 2.8% to 3.2% (e.g., 2.8, 2.81, 2.82, 2.83, 2.84, 2.85, 2.86, 2.87, 2.88, 2.89, 2.9, 2.91, 2.92, 2.93, 2.94, 2.95, 2.96, 2.97, 2.98, 2.99, 3% to about 3.1 or 3.2%) or about 2.9%, 2.91, 2.92, 2.93, 2.94 or 2.95%, or any range or value therein, of the mixture and/or composition.

In some embodiments, a concentrated formulation of a mixture and/or composition of the invention may comprise 2,4-D in an amount in a range of about 1% to about 35% w/v of the mixture and/or composition, e.g., about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 26, 26.5, 27, 27.5, 28, 28.5, 29, 29.5, 30, 30.5, 31, 31.5, 32, 32.5, 33, 33.5, 34, 34.5, or 35% w/v, or any range or value therein, of the mixture and/or composition. Thus, in some embodiments, the amount of 2,4-D in a concentrated formulation may be in a range of about 1% to about 5%, about 1% to about 10%, about 5% to about 35%, about 5% to about 25%, about 5% to about 15%, about 10% to about 35%, about 10% to about 30%, about 15% to about 30%, or about 15% to about 25% w/v, or any range or value therein, of the mixture and/or composition. In some embodiments, the amount of 2,4-D in a concentrated formulation may be about 1, 2, 3, 4, 5% to about 6, 7, 8, 9, or 10% w/v of the mixture and/or composition. In some embodiments, the amount of 2,4-D in a concentrated formulation may be about 2, 3, or 4% to about 5, 6 or 7% w/v of the mixture and/or composition. In some embodiments, the amount of 2,4-D in a concentrated formulation may be about 3% to about 6% w/v of the mixture and/or composition, optionally about 3.5% to about 5% (e.g., 3.5, 3.6, 3.7, 3.8, 3.9, 4, 4.1, 4.2, 4.3, 4.5, 4.6, 4.7, 4.8, 4.9, or 5%) or about 4% to 4.5% or about 4.1% to about 4.3% (e.g., 4.1, 4.11, 4.12, 4.13, 4.14, 4.15, 4.16, 4.17, 4.18, 4.19, 4.2, 4.21, 4.22, 4.23, 4.24, 4.25, 4.26, 4.27, 4.28, 4.29, or 4.3%, or any range or value therein, e.g., 4.2, 4.201, 4.202, 4.203, 4.204, 4.205, 4.206, 4.207, 4.208, 4.209, 4.21 w/v) of the mixture and/or composition.

In some embodiments, a concentrated formulation of a mixture or composition of the invention may comprise dicamba in an amount in a range of about 0.10% to about 10% w/v of the mixture and/or composition, e.g., about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10% w/v, or any range or value therein, of the mixture and/or composition. Thus, in some embodiments, the amount of dicamba in a concentrated formulation may be in a range of about 0.10% to about 2%, about 0.2% to about 3%, about 0.3% to about 1%, about 0.3% to about 2%, or about 0.3% to about 4% w/v, or any range or value therein, of the mixture and/or composition. In some embodiments, the amount of dicamba in a concentrated formulation may be about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2% w/v, or any range or value therein, of the mixture and/or composition. In some embodiments, the amount of dicamba in a concentrated formulation may be about 0.35, 0.36, 0.37, 0.38, 0.39, 0.4, 0.41, 0.42, 0.43, 0.44, 0.45, 0.46, 0.47, 0.48, 0.5, 0.51, 0.52, 0.53, 0.54, 0.55% w/v, or any range or value therein (e.g., about 0.46, 0.461, 0.462, 0.463, 0.464, 0.465, 0.466, 0.467, 0.468, 0.469, 0.47, 0.471, 0.472, 0.473, 0.474, or 0.475% w/v), of the mixture and/or composition.

In some embodiments, a concentrated formulation of a mixture or composition of the invention may comprise MCPP in an amount in a range of about 0.1% to about 10% w/v of the mixture and/or composition, e.g., about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10% w/v, or any range or value therein, of the mixture and/or composition. Thus, in some embodiments, the amount of MCPP in a concentrated formulation may be in a range of about 0.10% to about 2%, about 0.10% to about 5%, about 0.5% to about 2%, about 0.5% to about 5%, about 0.5% to about 10%, about 1% to about 5%, or about 1% to about 10% w/v, or any range or value therein, of the mixture and/or composition. In some embodiments, the amount of MCPP in a concentrated formulation may be about 0.1, 0.2, 0.3, 0.4, 0.5, 0.6, 0.7, 0.8, 0.9, or 1% to about 1.1, 1.2, 1.3, 1.4, 1.5, 1.6, 1.7, 1.8, 1.9, 2, 2.1, 2.2, 2.3, 2.4, or 2.5% w/v, or any range or value therein (e.g., about 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, or 1.2% w/v, (e.g., about 0.99, 0.991, 0.992, 0.993, 0.994, 0.995, 0.996, 0.997, 0.998, 0.999, 1, 1.001, 1.002, 1.003, 1.004, 1.005, 1.006, 1.007, 1.008, 1.009, 1.01 w/v) of the mixture and/or composition.

In some embodiments, a concentrated formulation of a mixture and/or composition of the invention may comprise isoxaben in an amount of about 2.7-2.9% w/v, or any range or value therein, of the mixture and/or composition, optionally about 2.8% (e.g., about 2.8, 2.801, 2.802, 2.803, 2.804, 2.805, 2.806, or 2.807%) w/v of the mixture and/or composition; dithiopyr in in an amount of about 2.8-3% w/v or any range or value therein, of the mixture and/or composition, optionally about 2.9% (e.g., about 2.9, 2.91, 2.92, 2.93, 2.94, 2.95, 2.96, 2.97, 2.98 or 2.99%) w/v of the mixture and/or composition, 2,4-D in an amount of about 4-5% w/v, or any range or value therein, of the mixture and/or composition, optionally about 4.2% (e.g., about 4.2, 4.201, 4.202, 4.203, 4.204, 4.205, 4.206, 4.207, 4.208, 4.209, or 4.21%) w/v of the mixture and/or composition; dicamba in an amount of about 0.4-0.5% w/v, or any range or value therein, of the mixture and/or composition, optionally about 0.46% (e.g., about 0.46, 0.461, 0.462, 0.463, 0.464, 0.465, 0.466, 0.467, 0.468, or 0.469%) w/v of the mixture and/or composition; and MCPP in an amount of about 1-1.1% w/v, or any range or value therein, of the mixture and/or composition, optionally about 1% (e.g., about 1, 1.001, 1.002, 1.003, 1.004, 1.005, 1.006, 1.007, 1.008, 1.009, or 1.01%) w/v of the mixture and/or composition. In some embodiments, a concentrated formulation of a mixture and/or composition of the invention may comprise isoxaben in an amount of about 2.805% w/v of the mixture and/or composition; dithiopyr in in an amount of about 2.92% w/v of the mixture and/or composition, 2,4-D in an amount of about 4.203% w/v of the mixture and/or composition; dicamba in an amount of about 0.469% w/v of the mixture and/or composition; and MCPP in an amount of about 1.003% w/v of the mixture and/or composition.

A ready-to-use (RTU) formulation of an herbicidal mixture and/or composition of the invention does not require further dilution before it may be applied to a plant, plant part and/or plant environment. A ready-to-use formulation may be prepared by diluting a concentrated formulation of a mixture or composition of the invention. For example, a concentrate of the herbicidal mixture and/or composition of the invention is diluted 1.5 oz in 1 gallon (128 oz)—a dilution of at least about 85 fold (85.33).

In some embodiments, a ready-to-use formulation of an herbicidal mixture and/or composition may comprise isoxaben in an amount in the range of about 0.02% w/v to about 0.5% w/v or any range or value therein, of the mixture and/or composition, e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.06, 0.07, 0.08, 0.09, 0.1, 0.15, 0.2, 0.25, 0.3, 0.35, 0.4, 0.45, or 0.5% w/v, or any range or value therein, of the mixture and/or composition. In some embodiments, a ready-to-use formulation of an herbicidal mixture and/or composition may comprise isoxaben in an amount in the range of about 0.02 to about 0.05% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, or 0.05% w/v). Thus, in some embodiments, the amount of isoxaben in a mixture and/or composition that is a ready-to-use formulation may be in a range of about 0.02%-0.04% w/v, optionally about 0.03%-0.04% w/v, (e.g., about 0.03, 0.031, 0.032, 0.033, 0.034, 0.035, 0.036, 0.037, 0.038, 0.039, 0.04% w/v) or may be in an amount of about 0.033% w/v.

In some embodiments, a ready-to-use formulation of an herbicidal mixture and/or composition may comprise dithiopyr in an amount in the range of about 0.02% w/v to about 0.5% w/v or any range or value therein, of the mixture and/or composition, e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05, 0.06, 0.07, 0.08, 0.09, 0.1, 0.15, 0.2, 0.25, 0.3, 0.35, 0.4, 0.45, or 0.5% w/v, or any range or value therein, of the mixture and/or composition. In some embodiments, a ready-to-use formulation of an herbicidal mixture and/or composition may comprise dithiopyr in an amount in the range of about 0.02 to about 0.05% w/v or any range or value therein, of the mixture and/or composition (e.g., about 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, or 0.05% w/v). In some embodiments, the herbicidal mixture as a ready to use formulation may comprise an amount of dithiopyr in the range of about 0.03-0.04 w/v, optionally in the range of about 0.03-0.035 w/v or about 0.033-0.035, or in an amount of about 0.0342 w/v.

In some embodiments, a ready-to-use formulation of an herbicidal mixture and/or composition may comprise 2,4-D in an amount in the range of about 0.01 to about 0.5% w/v or any range or value therein, of the mixture and/or composition (e.g., about 0.01, 0.011, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.0491, 0.0492, 0.0493, 0.0494, 0.0495, 0.0496, 0.0497, 0.0498, 0.0499, 0.05, 0.055, 0.06, 0.065, 0.07, 0.075, 0.08, 0.085, 0.09, 0.095 or 0.1% w/v). In some embodiments, the herbicidal mixture as a ready to use formulation may comprise an amount of 2,4-D in a range of about 0.03-0.06% w/v, optionally in a range of about 0.03-0.05% w/v or about 0.045-0.05% w/v, or in an amount of about 0.0493% w/v.

In some embodiments, a ready-to-use formulation of an herbicidal mixture and/or composition may comprise dicamba in an amount in the range of about 0.001% to about 0.01% w/v or any range or value therein, of the mixture and/or composition (e.g., about 0.001, 0.0015, 0.002, 0.0025, 0.003, 0.0035, 0.004, 0.0045, 0.005, 0.0055, 0.006, 0.0065, 0.007, 0.0075, 0.008, 0.0085, 0.009, 0.0095, 0.01% w/v). In some embodiments, the herbicidal mixture as a ready to use formulation may comprise an amount of dicamba in a range from about 0.004-0.01% w/v, optionally about 0.005-0.008% w/v, about 0.005-0.006% w/v, or about 0.0055% w/v.

In some embodiments, a ready-to-use formulation of an herbicidal mixture and/or composition may comprise MCPP in an amount in the range of about 0.005% to about 0.05% w/v or any range or value therein, of the mixture and/or composition (e.g., about 0.005, 0.0055, 0.006, 0.0065, 0.007, 0.0075, 0.008, 0.0085, 0.009, 0.0095, 0.01, 0.011, 0.0115, 0.0116, 0.0117, 0.0118, 0.0119, 0.012, 0.013, 0.014, 0.015, 0.016, 0.017, 0.018, 0.019, 0.02, 0.021, 0.022, 0.023, 0.024, 0.025, 0.026, 0.027, 0.028, 0.029, 0.03, 0.031, 0.032, 0.033, 0.034, 0.035, 0.036, 0.037, 0.038, 0.039, 0.04, 0.041, 0.042, 0.043, 0.044, 0.045, 0.046, 0.047, 0.048, 0.049, 0.05% w/v). In some embodiments, the herbicidal mixture as a ready to use formulation may comprise an amount of MCPP in a range from about 0.005%-0.05% w/v, optionally about 0.005-0.02% w/v, about 0.01-0.02% w/v, about 0.0115 to 0.012% w/v, or about 0.0118% w/v.

The herbicidal mixtures of the present invention comprising isoxaben, dithiopyr, 2,4-D (an acid, an ester, salt and/or choline thereof), dicamba (an acid and/or a salt thereof), and MCPP (an acid, an ester and/or salt thereof) provide the advantage of achieving the same herbicidal effect or an increased herbicidal effect as compared to standard herbicidal mixtures comprising 2,4-D, dicamba and MCPP or 2,4-D, dicamba, MCPP, and isoxaben but with at least about 40% to about 74% less than the amount of 2,4-D, dicamba, and MCPP or 2,4-D, dicamba, MCPP and isoxaben in standard herbicidal mixtures (Trimec (warm and cool season), Speedzone (warm and cool season), Southern Weed Killer and Season Long Weed Control (SLWC)). This effect is surprising and could not have been predicted from what was known about isoxaben, dithiopyr, 2,4-D, dicamba and/or MCPP prior to the disclosure of the present invention. Thus, in some embodiments, the amount of 2,4-D, dicamba, and MCPP or the amount of 2,4-D, dicamba, MCPP and isoxaben in an herbicidal mixture of the invention may be about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% less than the amount of 2,4-D, dicamba, and MCPP or the amount of 2,4-D, dicamba, MCPP and isoxaben in a standard herbicidal mixture.

An herbicidal mixture of the present invention may further comprise additional active ingredients in an amount in the range of about 0.02% to about 25% w/v (e.g., about 0.02, 0.03, 0.04, 0.05, 0.10, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25% w/v). In some embodiments, the active ingredient is a pre-emergent herbicide or a post-emergent herbicide. A post emergent herbicide useful with the invention may include, but is not limited to, a post-emergent broadleaf herbicide, a post-emergent crabgrass herbicide and/or a post-emergent grass herbicide. A pre-emergent herbicide useful with the invention may include, but is not limited to, atrazine, benefin, bensulide, DCPA, dimethenamid, ethofumesate, florasulam, flumioxazin, indaziflam, isoxaben, metolachlor, oryzalin, oxadiazon, pendimethalin, prodiamine, pronamide, siduron, and/or simazine. Non-limiting example post-emergent broadleaf herbicides useful with the invention include 2,4-DP, amicarbazone, atrazine, bentazon, bispyribac-sodium, bromoxynil, carfentrazone, chlorsulfuron, clopyralid, ethofumesate, flazasulfuron, florasulam, fluroxypyr, glyphosate, halosulfuron, imazapic, imazaquin, imazasulfuron, MCPA, mesitrione, metribuzin, metsulfuron, MSMA, penoxsulam, pyraflufen-ethyl, quinclorac, quinclorac, simazine, sulfentrazone, sulfosulfuron, thiencarbacone, thiencarbazone, topramezone, triclopyr, and/or trifloxysulfuron.

Post-emergent crabgrass herbicides useful with the herbicide mixtures of the invention include but are not limited to, atrazine, auslam, bispyribac-sodium, fenoxaprop, fluorasulam, MSMA, quinclorac, and/or simazine. Non-limiting example post-emergent grass herbicides useful with the invention include bentazon, carfentrazone, chlorsulfuron, clethodim, diflufenzopyr, diquat, fenoxaprop, flazasulfuron, fluazifop, fluoxapyr, foramsulfuron, glufosinate, glyphosate, halosulfuron, imazapyr, imazaquin, imazapic, imazethapyr, indaziflam, iodosulfuron, mesotrione, metribuzin, metsulfuron, MSMA, paraquat, pronamide, quinclorac, risulfuron, sethoxydim, sulfentrazone, topramezone and/or trilcopyr.

The present invention further provides methods of using the herbicidal mixtures or composition(s) of the present invention.

In some embodiments, the present invention provides a method of controlling plant growth comprising contacting a plant, plant part, and/or a plant environment with an effective amount of an herbicidal mixture of the present invention as described herein. In some embodiments, the present invention provides a method of controlling plant growth comprising contacting a plant, plant part, and/or a plant environment with an effective amount of a composition comprising, consisting essentially of, or consisting of isoxaben, dithiopyr, 2,4-Dichlorophenoxyacetic acid (2,4-D) and/or an ester, salt and/or choline thereof, 3,6-dichloro-2-methoxybenzoic acid (dicamba) and/or a salt thereof, and methylchlorophenoxypropionic acid (Mecoprop or MCPP) and/or an ester and/or salt thereof as described herein.

In some embodiments, the present invention provides a method of controlling undesirable plant growth in turf comprising contacting an undesired plant, plant part, and/or plant environment with an effective amount of the herbicidal mixture of the present invention as described herein. In some embodiments, the present invention provides a method of controlling undesirable plant growth in turf comprising contacting an undesired plant, plant part, and/or plant environment with an effective amount of a composition comprising isoxaben, dithiopyr, 2,4-Dichlorophenoxyacetic acid (2,4-D) and/or an ester, salt and/or choline thereof, 3,6-dichloro-2-methoxybenzoic acid (dicamba) and/or a salt thereof, and methylchlorophenoxypropionic acid (Mecoprop or MCPP) and/or an ester and/or salt thereof as described herein.

In some embodiments, the present invention provides a method of controlling seed germination comprising contacting a plant environment with an effective amount of the herbicidal mixture of the present invention as described herein. In some embodiments, the present invention provides a method of seed germination comprising contacting a plant environment with an effective amount of a composition comprising, consisting essentially of, or consisting of isoxaben, dithiopyr, 2,4-Dichlorophenoxyacetic acid (2,4-D) and/or an ester, salt and/or choline thereof, 3,6-dichloro-2-mnethoxybenizoic acid (dicamba) and/or a salt thereof, and methylchlorophenoxypropionic acid (Mecoprop or MCPP) and/or an ester and/or salt thereof as described herein.

In some embodiments, the present invention provides a method of controlling seed germination in turf comprising contacting a plant environment (e.g., the turf) with an effective amount of the herbicidal mixture of the present invention as described herein. In some embodiments, the present invention provides a method of controlling seed germination in turf comprising contacting a plant environment (e.g., the turf) with an effective amount of a composition comprising, consisting essentially of, or consisting of isoxaben, dithiopyr, 2,4-Dichlorophenoxyacetic acid (2,4-D) and/or an ester, salt and/or choline thereof, 3,6-dichloro-2-methoxybenzoic acid (dicamba) and/or a salt thereof, and methylchlorophenoxypropionic acid (Mecoprop or MCPP) and/or an ester and/or salt thereof as described herein.

As used herein, the term “turf” refers to an area in which turfgrasses are grown. A turfgrass (i.e., a grass or grass-like plant grown and used for turf) can be any turfgrass now known or later developed. Example turfgrasses include, but are not limited to, Kentucky bluegrass, perennial ryegrass, bentgrass, tall fescue, fine fescue, Bermuda grass, St. Augustine grass, zoysia grass, bahaigrass, buffalograss, carpetgrass, centipede grass, kikuyu grass, seashore paspalam. A turf can be comprised of one or more different types of turfgrasses (e.g., a combination of two or more different types of turfgrasses).

As used herein, an “effective amount” of the herbicidal mixture means an amount of about 500 grams/hectare to about 1000 g/ha. In some embodiments, an effective amount is about 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 g/ha. In some embodiments, an effective amount is about 550, 560, 570, 580, 590, 600, 610, 620, 630, 640, 650, 660, 670, 680, 690, 700, 710, 720, 730, 740, or 750 g/ha, optionally about 600 to about 700 g/ha (e.g. about 600, 601, 602, 603, 604, 605, 606, 607, 608, 609, 610, 611, 612, 613, 614, 615, 616, 617, 618, 619, 620, 621, 622, 623, 624, 625, 626, 627, 628, 629, 630, 631, 632, 634, 635, 636, 637, 638, 639, 640,641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 673, 674, 675, 676, 676, 678, 679, 680, 681, 682, 683, 684, 685, 686, 687, 688, 689, 690, 691, 692, 693, 694, 695, 696, 697, 698, 699, or 700 g/ha) or about 640, 641, 642, 643, 644, 645, 646, 647, 648, 649, or 650 g/ha.

When applied to plant environments, plants, and parts thereof, including seeds, an herbicidal mixture of the invention achieves the same herbicidal effect or an increased herbicidal effect (e.g., killing the same type of weeds or additional weeds in the same time frame or more quickly with the same or an increased level of residual control and/or controlling weed seed germination with the same or an increased level of residual control) as compared to standard herbicidal mixtures comprising 2,4-D, dicamba and MCPP, but with at least about 40% to about 74% less 2,4-D, dicamba and MCPP, optionally isoxaben (e.g., about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, or 74% less), wherein the standard herbicidal mixtures include, but are not limited to, Trimec® (warm and cool season), SpeedZone® (warm and cool season), Southern Weed Killer, and Season Long Weed Control (SLWC; dicamba, 2,4-D, MCPP and isoxaben).

In some embodiments, "controlling plant growth" of "controlling undesirable plant growth" includes residual control (e.g., control over time) of the plant or plant part. In some embodiments, controlling plant growth also includes increased residual control of seed germination as compared to a control. The residual control of plant growth and seed germination is believed to be an effect of the combination of dithiopyr with isoxaben, 2, 4-D, dicamba and MCPP (e.g., the formulations of the invention). In some embodiments, residual control of the plant or plant part or residual control of seed germination may be increased as compared to a control (e.g., the plant and/or plant part contacted with standard herbicidal compositions (e.g., 2,4-D, dicamba and MCPP, e.g., 2,4-D, dicamba, MCPP and isoxaben).

In some embodiments, residual control of a plant or plant part contacted with the mixtures and/or compositions of the invention (or a plant or plant part in a plant environment that has been contacted with the mixtures and/or compositions of the invention) may be over a period of time in the range of about 4 to about 8 months after contacting the plant, plant part or the plant environment, e.g., about 4, 5, 6, 7, or 8 months, or any value or range therein, after contacting the plant, plant part or the plant environment. In some embodiments, the compositions of the invention (e.g., the dithiopyr in combination with isoxaben, 2, 4-D, dicamba and/or MCPP) provide residual control of plant growth or seed germination that is increased to about 4-6 months (e.g., 4, 5, or 6 months; e.g., about 16, 17, 18, 19, 20, 21, 22, 23, or 24 weeks) as compared to 2-3 months (e.g., about 8, 9, 10, 11, or 12 weeks) for the control (e.g., dithiopyr in the absence of isoxaben, 2, 4-D, dicamba and/or MCPP). In some embodiments, the residual control of the compositions of the invention (e.g., the dithiopyr in combination with isoxaben, 2, 4-D, dicamba and/or MCPP) is increased by at least about 30% to about 70% (e.g., about 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70%). As an example, the length of time that pre-emergent control of crabgrass by dithiopyr is effective may be increased by about 50-70% (e.g., about 50, 51, 52, 53, 54, 55, 56, 57, 58, 59, 60, 61, 62, 63, 64, 65, 66, 67, 68, 69, 70%, e.g., about 6 months residual control as compared to about 2 months to 3 months for the standard herbicide). In some embodiments, the length of time that pre-emergent control of a plant or part thereof (e.g., crabgrass) by dithiopyr is effective may be increased by about 30-40% (e.g., about 30, 31, 32, 33, 34, 35, 36, 37, 38, 39, or 40%) or about 30-35% (e.g., about 30, 31, 32, 33, 34, or 35%) As a further example, the length of time that pre-emergent control of a plant or part thereof (e.g., crabgrass) by dithiopyr is effective may be increased by about 33% (e.g., about 6 months residual control as compared to about 4 months for the standard herbicide).

Thus, in some embodiments, the present invention provides a method of providing residual control of a plant and/or plant part comprising contacting a plant, plant part, and/or a plant environment with an effective amount of an herbicidal mixture of the present invention as described herein. In some embodiments, the present invention provides a method of providing residual control of a plant and/or plant part comprising contacting a plant, plant part, and/or a plant environment with an effective amount of a composition comprising, consisting essentially of, or consisting of isoxaben, dithiopyr, 2,4-Dichlorophenoxyacetic acid (2,4-D) and/or an ester, salt and/or choline thereof, 3,6-dichloro-2-methoxy benzoic acid (dicamba) and/or a salt thereof, and methylchlorophenoxypropionic acid (Mecoprop or MCPP) and/or an ester and/or salt thereof as described herein.

In some embodiments, controlling plant growth may comprise increased control of seed germination as compared to a control (e.g., dithiopyr in the absence of isoxaben, 2, 4-D, dicamba and/or MCPP). In some embodiments, increased control of seed germination may comprise a reduction in seed germination and/or a reduction in seed germination over time. In some embodiments, seed germination may be reduced by about 5% to about 100% (e.g., about 5, 10, 15, 20, 25, 30, 35, 40, 45, 50, 55, 60, 65, 70, 75, 80, 85, 90, 95, or 100%, or any range or value therein) as compared to a control (e.g., seeds contacted with dithiopyr alone or dithiopyr in the absence of isoxaben, 2, 4-D, dicamba and/or MCPP; or seeds located in a plant environment that has been contacted with dithiopyr alone or dithiopyr in the absence of isoxaben, 2, 4-D, dicamba and/or MCPP). Thus, in some embodiments, the methods of the invention may result in seed germination of about 0% to about 5%, 0% to about 10%, about 0% to about 15%, about 0% to about 20%, and any range or value therein (e.g., 0, 1, 2, 3, 4, 5, 6, 7, 8, 9, 10, 11, 12, 13, 14, 15, 16, 17, 18, 19, or 20%), as compared to a control. The herbicidal mixture or formulation may be used to control germination of any seed. In some embodiments, the seed for which germination is controlled or reduced is crabgrass seed.

Thus, in some embodiments, the present invention provides a method of reducing seed germination, the method comprising contacting a plant, plant part (e.g. a seed) and/or a plant environment with an effective amount of an herbicidal mixture of the present invention as described herein. In some embodiments, the present invention provides a method of reducing seed germination, the method comprising contacting a plant, plant part (e.g. a seed) and/or a plant environment with an effective amount of a composition comprising, consisting essentially of, or consisting of isoxaben, dithiopyr, 2,4-Dichlorophenoxyacetic acid (2,4-D) and/or an ester, salt and/or choline thereof, 3,6-dichloro-2-methoxybenzoic acid (dicamba) and/or a salt thereof, and methylchlorophenoxypropionic acid (Mecoprop or MCPP) and/or an ester and/or salt thereof as described herein.

In some embodiments, methods of the present invention may provide reduced seed germination over a greater period of time than a control (e.g., seeds contacted with dithiopyr alone or dithiopyr in the absence of isoxaben, 2, 4-D, dicamba and/or MCPP; or seeds located in a plant environment that has been contacted with dithiopyr alone or dithiopyr in the absence of isoxaben, 2, 4-D, dicamba and/or MCPP). Thus, in some embodiments, seed germination may be reduced for about 2 weeks to about 6 months (e.g., about 2, 3, 4, 5, 6, 7, 8, 9, 10, 11, 12 weeks, 4, 5, or 6 months, or any value or range therein; e.g., about 2 weeks to 3 weeks, about 2 weeks to 4 weeks about 2 weeks to 8 weeks about 1 month to about 2 months, about 1 month to 3 months, about 1 month to about 4 months, about 1 month to about 5 months, about 1 month to about 6 months, and the like and any range or value therein) after contact with the compositions and/or mixtures of the invention. In some embodiments, the methods of the present invention may reduce seed germination by about 5% to about 100% over a period of time from about 2 weeks to about 6 months (e.g., about 5, 10, 15, 20, 25, 30, 35, 40, 45, 50, 55, 60, 65, 70, 75, 80, 85, 90, 91, 92, 93, 94, 95, 96, 97, 98, 99, or 100%, or any value or range therein, over a period of time from about 2, 3, 4, 5, 6, 7, 8, 9, 10, 11, 12, 13, 14, 15, 16, 17, 18, 19, 20, 21, 22, 23, or 24 weeks, or any value or range therein). In some embodiments, the methods of the present invention may reduce seed germination by about 25% to about 100%, about 50% to about 100%, about 75% to about 100%, about 90% to about 100%, about 25% to about 95%, about 50% to about 95%, about 75% to about 95%, about 90% to about 95%, or any value or range therein, or about 30%, 40%, 50%, 60%, 65%, 70%, 75% to about 80%, 85%, 90%, 95%, 96%, 97%, 98%, 99%, 100%, or any value or range therein, over a period of time from about 2 weeks to about 6 months, as compared to a control. Thus, in some embodiments, the present invention provides a method of reducing seed germination over a greater period of time than a control (e.g., seeds contacted with dithiopyr alone or dithiopyr in the absence of isoxaben, 2, 4-D, dicamba and/or MCPP; or seeds located in a plant environment that has been contacted with dithiopyr alone or dithiopyr in the absence of isoxaben, 2, 4-D, dicamba and/or MCPP), the method comprising contacting a plant, plant part (e.g., a seed) and/or a plant environment with an effective amount of an herbicidal mixture of the present invention as described herein.

In some embodiments, a plant and/or plant part useful with this invention (e.g., for which control of growth may be desirable) may be a dicot (broadleaf) plant. In some embodiments, a plant and/or plant part useful with this invention (e.g., for which control of growth may be desirable) may be a monocot. A non-limiting example of a monocot useful with this invention may be a grass. Examples of plants and/or plant parts useful with this invention (e.g., for which control of growth may be desirable) include, but are not limited to, barley, barnyardgrass, annual bluegrass (*Poa annua*), brome, crabgrass, smooth crabgrass, southern crabgrass, crowfootgrass, dallisgrass (seedling), goosegrass, foxtail (green and yellow), marestail, oats (wild), ryegrass (annual), sandbur (sandspur, grassbur), smutgrass, annual yellow sweetclover, aster, Austrian fieldcress, bedstraw, beggarticks, Florida betony, field bindweed, bird vetch, bitter wintercress, hairy bittercress, bitterweed, black-eyed susan, black medic, black mustard, blackseed plantain, blessed thistle, bloodower milkweed, blue lettuce, blue vervain, bracted plantain, brassbuttons, bristly oxtongue, broadleaf dock, broadleaf plantain, broomweed, buckhorn, buckhorn plantain, bulbous buttercup, bull thistle, bullnettle, burclover, burdock, burning nettle, burweed, buttercup, buttonweed, Canada thistle, Carolina geranium, carpetweed, catchweed bedstraw, catnip, catsear, chickweed, common chickweed, mouseear chicory, cinquefoil, clover, crimson clover, hop clover, red clover, strawberry clover, sweet clover, cockle (white), cocklebur (common) mullein, creeping charlie, creeping jenny, cudweed, curly dock, daisy (English, fleabane, and oxeye), dandelion, dichondra, dogbane, dogfennel, dollarweed, elderberry, false dandelion, false flax, false sunflower, fiddleneck, Florida pusley, Frenchweed, galinsoga, goathead, goldenrod, ground ivy, gumweed, hairy fleabane, hawkweed, healall, heartleaf drymary, heath aster, hedge bindweed, hedge mustard, hemp, henbit, hoary cress, hoary plantain, hoary vervain, horsenettle, jimsonweed, knawel, knotweed, kochia, lambsquarters, lespedeza, mallow, matchweed, Mexicanweed, milk vetch, morning glory, mouseear hawkweed, mugwort, musk thistle, mustard, narrowleaf plantain, narrowleaf vetch, nettle, orange hawkweed, oriental cocklebur, oxalis, parsleypiert, parsnip, pearlwort, pennycress, pennywort, pepperweed, pigweed, pineywoods bedstraw, plains coreopsis (tickseed), plantain, poison ivy, poison oak, pokeweed, poorjoe, prairie sunflower, prickly lettuce, prickly sida, prostrate knotweed, prostrate pigweed, prostrate spurge, prostrate vervain, puncturevine, purslane (common), ragweed, red sorrel, redroot pigweed, redstem filaree, rough cinquefoil, rough fleabane, Russian pigweed, Russian thistle, scarlet pimpernel, scotch thistle, sheep sorrel, shepherdspurse, slender plantain, smallower galinsoga, smooth dock, smooth pigweed, sorrel, sowthistle, spanishneedles, speedwell, spiny amaranth, spiny cocklebur, spiny sowthistle, spotted catsear, spotted spurge, spurweed, stinging nettle, strawberry, Indian strawberry, mock strawberry, tall nettle, tall vervain, tansy mustard, tanweed, thistle, trailing crownvetch, tumble mustard, tumble pigweed, velvetleaf, venice mallow, Virginia buttonweed, Virginia creeper, Virginia pepperweed, water pennywort, wavyleaf bullthistle, western clematis, western salsify, white mustard, wild aster, wild buckwheat, wild carrot, wild four-o'clock, wild garlic, wild geranium, wild lettuce, wild marigold, wild mustard, wild onion, wild parsnip, wild radish, wild rape, wild strawberry, wild sweet potato, wild vetch, woodsorrel, wooly croton, wooly morning glory, wooly plantain, wormseed, yarrow, yellow rocket, yellow pepperweed, ground ivy, wild violet, or any combination thereof.

In some embodiments, the plant and/or plant part for which control is desirable is crabgrass or is from crabgrass. In some embodiments, the crabgrass is mature and comprises at least one tiller (e.g., is at a post-tillering stage). In some embodiments, the crabgrass comprises at least 3 tillers (e.g., 3, 4, 5, or more tillers). Crabgrass propagates by seed, first sending up a cotyledon and then forming true leaves. After a crabgrass plant has formed three or four leaves, it will start to produce side shoots, called tillers. Crabgrass is more difficult to control when plants are in the post-tillering stage. A single plant is capable of producing 150 to 700 tillers and 150,000 seeds. The present inventors have surprisingly found that the herbicidal mixture of the present invention is able to control crabgrass at the post-tillering stage. Thus, the herbicidal mixtures of the present invention provide an increased control of crabgrass that is post-tillering as compared to standard herbicidal compositions (e.g., control compositions comprising only dithiopyr, or control compositions comprising only 2,4-D, dicamba, MCPP, and isoxaben, e.g., SLW.)

The invention will now be described with reference to the following examples. It should be appreciated that these examples are not intended to limit the scope of the claims to the invention but are rather intended to be exemplary of certain embodiments. Any variations in the exemplified methods that occur to the skilled artisan are intended to fall within the scope of the invention.

EXAMPLES

Example 1

A comparison of the amount of active ingredient (AI) in the herbicidal mixtures of the present invention compared to the amount of active ingredient in commercially available weed control formulations.

TABLE 1

A comparison of the amount of active ingredient in the herbicidal mixtures of the invention compared to standard herbicidal mixtures

| | % AI SLWC | % AI SLWC + Dithiopyr* | % AI Trimec Cool | % AI Trimec Cool | % AI Trimec Warm | % AI Trimec Warm | % AI Speedzone Cool | % AI Speedzone Cool | % AI Speedzone Warm | % AI Speedzone Warm |
|---|---|---|---|---|---|---|---|---|---|---|
| Components | | | Low | Hi | Low | Hi | Low | Hi | Low | Hi |
| 2,4-D | 0.2365 | 0.0985 | 0.243 | 0.304 | 0.152 | 0.304 | 0.246 | 0.402 | 0.246 | 0.355 |
| Dicamba | 0.0268 | 0.0108 | 0.026 | 0.032 | 0.016 | 0.032 | 0.015 | 0.024 | 0.015 | 0.02 |
| MCPP | 0.055 | 0.0235 | 0.065 | 0.081 | 0.041 | 0.081 | 0.051 | 0.083 | 0.051 | 0.069 |
| Total | 0.3183 | 0.1328 | 0.334 | 0.417 | 0.209 | 0.417 | 0.312 | 0.509 | 0.312 | 0.444 |
| % Reduction vs Standards | | | 60.24 | 68.15 | 36.46 | 68.15 | 57.44 | 73.91 | 57.44 | 70.09 |

Trimec - standard; cool and warm season
Speedzone - standard; cool and warm season
SLWC = Season long weed control (Label: 3.94% 2,4-D, 2.63% isoxaben, 0.44% dicamba, 0.94% MCPP,)
SLWC + dithiopyr = composition of the invention in a liquid form Table 1 shows that the amount of active ingredient (e.g., the amount of 2,4-D, the amount of dicamba and the amount of MCPP) in the herbicidal mixtures is substantially reduced (at least 40% less than that in the standard herbicidal mixtures).

Example 2

A trial of formulations of the present invention (dithiopyr, isoxaben, MCPP, 2,4-D, and dicamba) was carried out and is shown in Table 2, below. The trial was initiated on Mar. 12, 2019 on Kentucky bluegrass. The turf was maintained at a height of 2½ inches, watered (twice weekly to ½ inch) and fertilized at local recommendations (0.5 lbs. once June $15^{th}$). Pre-emergent control of Large Crabgrass was evaluated as a percentage of the area in the test plots (1 xl meter and 3 replicates).

The addition of Dithiopyr to the BioAdvanced Science Based Solutions Season Long Weed Control (SLWC) did not affect the pre-emergent control of Large Crabgrass. Lower levels of dithiopyr showed equal control of Large Crabgrass when formulated with the SLWC formulation.

Example 3

A trial of formulations of the present invention (dithiopyr, isoxaben, MCPP, 2,4-D, and dicamba; e.g., dithiopyr and SLWC) was carried out and is shown in Table 3, below. The trial was initiated on Mar. 12, 2019 on Tall Fescue. The turf was maintained at the height of 2½ inches and watered (twice weekly to ½ inch). Pre-emergent control of Large Crabgrass was evaluated as a percentage of the area in the test plots (1 xl meter and 3 replicates).

The addition of Dithiopyr to the BioAdvanced Science Based Solutions Season Long Weed Control did not affect the pre-emergent control of Large Crabgrass. Lower levels of dithiopyr showed equal control of Large Crabgrass when formulated with 2,4-D, dicamba, MCPP, and isoxaben (SLWC).

Example 4

A trial of the formulation of the present invention (dithiopyr, isoxaben, MCPP, 2,4-D, and dicamba, e.g., dithiopyr and SLWC) was carried out and is shown in Table 4, below. The trial was initiated on Mar. 12, 2019 on Tall Fescue. The turf was maintained at the height of 2½ inches and watered (twice weekly to ½ inch). Pre-emergent control of Broadleaf weeds (dandelions, Oxalis, plantain and white clover) was evaluated as a percentage of the area in the test plots (1×1 meter and 3 replicates).

The addition of Dithiopyr to the BioAdvanced Science Based Solutions Season Long Weed Control did not affect the pre-emergent control of broadleaf weeds provided by Isoxaben (tested directly against isoxaben (Gallery 75 DF)). Lower levels of isoxaben in the formulations tested showed equal pre-emergent control of broadleaf weeds compared to the isoxaben (Gallery 75 DF) alone at the label rate. The addition of dithiopyr did not adversely affect the pre-emergent control of the weeds by isoxaben.

Example 5

A trial of formulations of the present invention (dithiopyr, isoxaben, MCPP, 2,4-D, and dicamba, e.g., dithiopyr and SLWC) was carried out and is shown in Table 5, below. The trial was initiated on Mar. 12, 2019 on Kentucky bluegrass. The turf was maintained at a height if 2½ inches and watered (twice weekly to ½ inch). Pre-emergent control of Broadleaf weeds (dandelions, Oxalis, and white clover) was evaluated as a percentage of the area in the test plots (1×1 meter and 3 replicates).

The addition of dithiopyr to BioAdvanced Science Based Solutions Season Long Weed Control did not affect the pre-emergent control of broadleaf weeds provided by isoxaben (tested directly against isoxaben (e.g., Gallery 75 DF)). Lower levels of isoxaben in the formulations tested showed equal pre-emergent control of broadleaf weeds compared to the straight isoxaben (e.g., Gallery 75 DF) at the label rate. The addition of dithiopyr did not adversely affect the pre-emergent control by isoxaben.

Example 6

A trial of formulations of the present invention (dithiopyr, isoxaben, MCPP, 2,4-D, and dicamba, e.g., dithiopyr and SLWC) was carried out and is shown in Table 6, below. The trial was initiated on Mar. 12, 2019 on Bermuda grass. The turf was maintained at a height of 1½ inches and watered (weekly to ½ inch). Pre-emergent control of broadleaf weeds (Oxalis, Parsley-Preriot and white clover) were evaluated as a percentage of the area in the test plots (1×1 meter and 3 replicates).

The addition of Dithiopyr to the BioAdvanced Science Based Solutions Season Long Weed Control did not affect the pre-emergent control of broadleaf weeds provided by Isoxaben (tested directly against isoxaben (e.g., Gallery 75 DF). Lower levels of isoxaben in the formulations tested showed equal pre-emergent control of broadleaf weeds compared to the straight isoxaben (e.g., Gallery 75 DF) at the label rate. The addition of dithiopyr did not adversely affect the pre-emergent control by isoxaben.

Example 7

A trial studying the effects of different formulations of the invention (dithiopyr, isoxaben, MCPP, 2,4-D, and dicamba, e.g., dithiopyr and SLWC) and BioAdvance Season Long Weed Control (SLWC) on post-emergent control of dandelions was carried out. The trial was initiated on Mar. 29, 2019 on Fescue, which was maintained at 2 inches of height and watered weekly. The results showed that there was no significant difference in the post emergent control of dandelions (FIG. 1). The reduction in the amounts of dicamba, 2,4 D and MCCP, the post control elements of the SLWC, did not significantly reduce the control of dandelions by the new formulations.

Example 8

Figure 2:
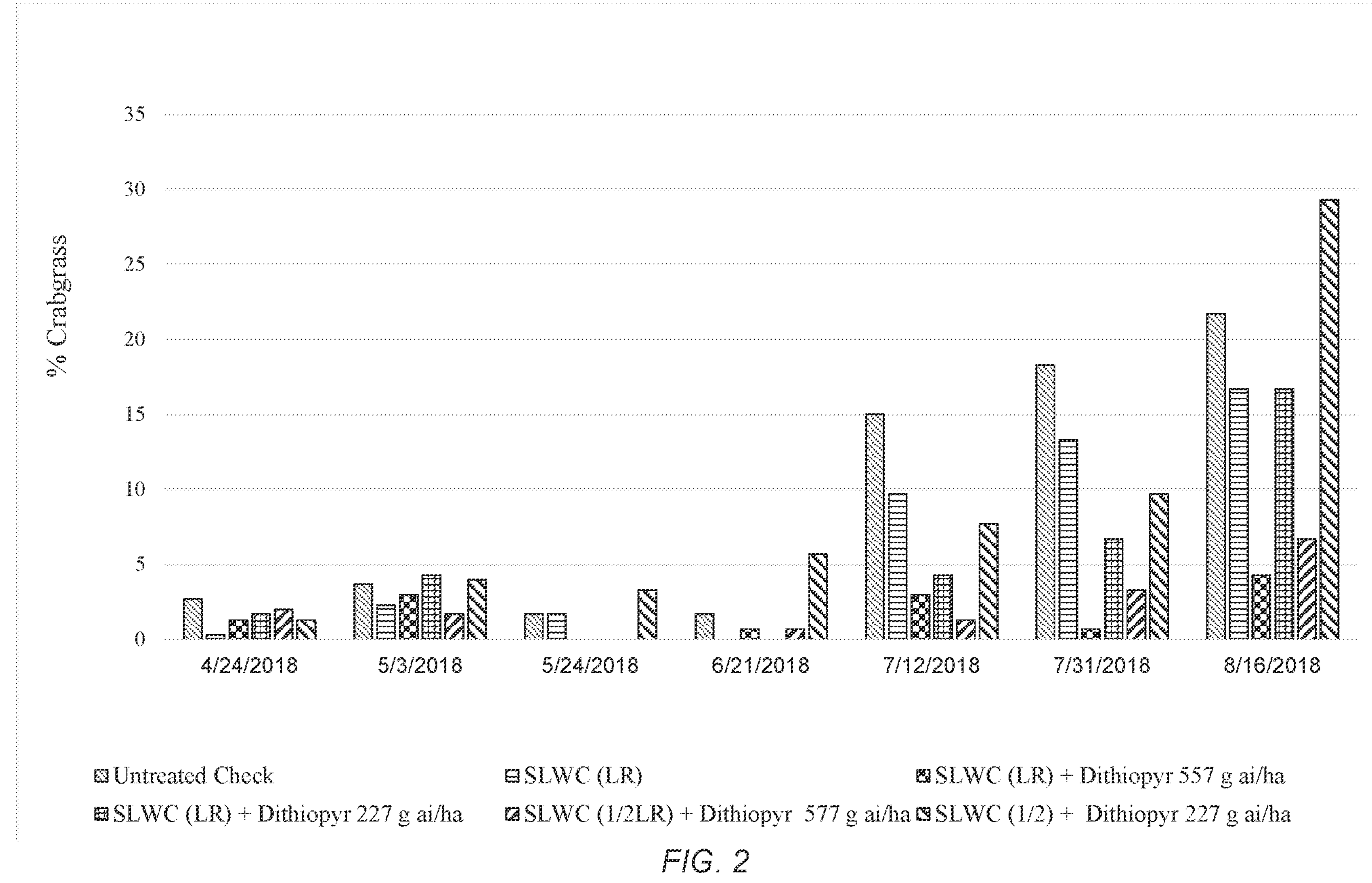
FIG. 2 shows the percent crabgrass in test plots over time treated with BioAdvance Season Long Weed Control (SLWC) and different formulations of the invention comprising dithiopyr (D), isoxaben, 2,4-D, dicamba and MCPP (e.g., SLWC (at the labeled rate and ⅕, ⅓ and ½ the labeled rate (LR))+dithiopyr (D) at 227 g ai/ha or at 557 g ai/ha).

A trial studying the effects on crabgrass control using different formulations of the invention (dithiopyr, isoxaben, MCPP, 2,4-D, and dicamba, e.g., dithiopyr and SLWC) and BioAdvance Season Long Weed Control (SLWC) was carried out. The trial was initiated on Apr. 24, 2018 on tall fescue. Turf was maintained at about a height of 2 inches and watered ½ inch twice a week. The field had a history of crabgrass. The SLWC was sprayed first followed by the dithiopyr (e.g., Dimension 2EC). The formulas with the 557 g ai/ha od dithiopyr worked significantly better than the lower rates and the concentration of SLWC did not have an effect on the reduction of the crabgrass in the trial (FIG. 2).

TABLE 2

Trial comparing formulations of the invention (dithiopyr, isoxaben, 2,4-D, dicamba and MCPP (SLWC + dithiopyr)) to dithiopyr only (Dimension) and isoxaben only (Gallery 75 DF) in controlling Large Crabgrass in Kentucky bluegrass.

| Treatment | Percent of SLWC | Dithiopyr Rate g | Rating Date | | | | | | | | | | | | | |
|---|---|---|---|---|---|---|---|---|---|---|---|---|---|---|---|---|
| | | | May 20, 2019 | | Jun. 3, 2019 | | Jul. 1, 2019 | | Jul. 15, 2019 | | Jul. 29, 2019 | | Aug. 20, 2019 | | Sep. 19, 2019 | |
| | | | Trt-Eval Interval | | | | | | | | | | | | | |
| Name | AI's | ai/ha | 69 DA-A | | 83 DA-A | | 111 DA-A | | 125 DA-A | | 139 DA-A | | 161 DA-A | | 191 DA-A | |
| Untreated Check | | | 2.7 | — | 6.7 | — | 23.3 | a | 33.3 | a | 58.3 | a | 56.7 | — | 86.3 | a |
| SLWC Plus Dithiopyr | 0.50 | 558 | 0 | — | 0 | — | 0 | b | 0 | b | 7.3 | b | 15 | — | 16.7 | c |
| SLWC Plus Dithiopyr | 0.33 | 279 | 0 | — | 1.7 | — | 6.7 | b | 3 | b | 16.7 | b | 28.3 | — | 38.3 | c |
| SLWC Plus Dithiopyr | 0.2 | 111.2 | 0.7 | — | 0 | — | 3 | b | 4.3 | b | 13.3 | b | 16.7 | — | 33.3 | c |
| Dithiopyr (Dimension) | | 280 | 0 | — | 0 | — | 5.7 | b | 5 | b | 16 | b | 26.7 | — | 40 | bc |
| Isoxaben (Gallery 75 DF) | LR | | 0 | — | 0 | — | 6 | b | 15 | ab | 30 | b | 28.3 | — | 73.3 | ab |
| LSD P = .05 | | | 1.93 | | 5.67 | | 8.52 | | 19.43 | | 23.8 | | 28.84 | | 34.64 | |
| Standard Deviation | | | 1.06 | | 3.12 | | 4.68 | | 10.68 | | 13.08 | | 15.86 | | 19.04 | |
| CV | | | 190.68 | | 224.5 | | 62.89 | | 105.65 | | 55.4 | | 55.42 | | 39.67 | |

a.i. or AI = active ingredient;

ha = hectare;

DA-A + days after application;

LR = labelled rate

Different letters beside the data point indicate significant differences at the 0.05 significance level

TABLE 3

Trial comparing formulations of the invention (dithiopyr, isoxaben, 2,4-D, dicamba and MCPP (SLWC + dithiopyr)) to dithiopyr only (Dimension) and isoxaben only (Gallery 75 DF) in controlling Large Crabgrass in Tall Fescue.

| Treatment | Percent of SLWC | Dithiopyr Rate g | Rating Date May 20, 2019 | Jun. 3, 2019 | Jul. 1, 2019 | Jul. 15, 2019 | Jul. 29, 2019 | Aug. 20, 2019 | Sep. 19, 2019 |
|---|---|---|---|---|---|---|---|---|---|
| | | | Trt-Eval Interval | | | | | | |
| Name | AI's | ai/ha | 69 DA-A | 83 DA-A | 111 DA-A | 125 DA-A | 139 DA-A | 161 DA-A | 191 DA-A |
| Untreated Check | | | 0 — | 0 — | 13 a | 18.3 — | 38.3 a | 70 a | 83.3 a |
| SLWC + Dithiopyr | 0.50 | 558 | 0 — | 0 — | 0 b | 0.7 — | 1.7 b | 5 b | 10 c |
| SLWC + Dithiopyr | 0.33 | 279 | 0 — | 0 — | 0.7 b | 10.3 — | 13.3 b | 46.7 a | 63.3 ab |
| SLWC + Dithiopyr | 0.2 | 111.2 | 0 — | 0 — | 1 b | 6.3 — | 9.3 b | 50 a | 56.7 ab |
| Dithiopyr (Dimension) | | 280 | 0 — | 0 — | 0.7 b | 5 — | 7.3 b | 43.3 a | 50 b |
| Isoxaben (Gallery 75 DF) | | | 0 — | 0 — | 7.7 ab | 16 — | 21.7 ab | 58.3 a | 63.3 ab |
| LSD P = .05 | | | . | . | 8.25 | 13.96 | 21.62 | 32.15 | 28.89 |
| Standard Deviation | | | 0 | 0 | 4.54 | 7.67 | 11.88 | 17.67 | 15.88 |
| CV | | | 0 | 0 | 118.31 | 81.23 | 77.78 | 38.79 | 29.17 |

a.i. or AI = active ingredient;
ha = hectare;
DA-A + days after application
Different letters beside the data point indicate significant differences at the 0.05 significance level

TABLE 4

Trial comparing formulations of the invention (dithiopyr, isoxaben, 2,4-D, dicamba and MCPP (SLWC + dithiopyr)) to isoxaben (Gallery DF) in pre-emergent control of broadleaf weeds (in Tall Fescue)

| Treatment | Percent of SLWC | Isoxaben Rate g | Percent Amount of Broadleaf weeds present in Test plots Rating Date: Mar. 18, 2019 | Apr. 10, 2019 | May 6, 2019 | Jun. 3, 2019 | Jul. 1, 2019 | Jul. 15, 2019 | Jul. 29, 2019 | Aug. 20, 2019 |
|---|---|---|---|---|---|---|---|---|---|---|
| | | | Trt-Eval Interval | | | | | | | |
| Name | AI's | ai/ha | 6 DA-A | 29 DA-A | 55 DA-A | 83 DA-A | 111 DA-A | 125 DA-A | 139 DA-A | 161 DA-A |
| Untreated Check | | | 4.3 — | 8.3 — | 13.3 a | 9.7 — | 11 — | 4.3 — | 5 — | 1.7 — |
| SLWC + Dithiopyr (½ SLWC) | 0.5 | 268 | 0 — | 0 — | 0 b | 1.3 — | 0 — | 0 — | 0 — | 0 — |
| SLWC + Dithiopyr (⅓ SLWC) | 0.33 | 179 | 0 — | 0 — | 0 b | 0 — | 3.3 — | 2 — | 2.3 — | 0 — |
| SLWC + Dithiopyr (⅕ SLWC) | 0.2 | 107 | 0 — | 0 — | 2.7 b | 3 — | 2.7 — | 0.7 — | 1 — | 0 — |
| Isoxaben (Gallery 75 DF) | 0 | 1144 | 3.3 — | 2.7 — | 2 b | 8.3 — | 2.7 — | 0.7 — | 4 — | 0 — |
| LSD P = .05 | | | 6.55 | 6.86 | 9.18 | 8.58 | 9.99 | 4.99 | 6.99 | 2.43 |
| Standard Deviation | | | 3.48 | 3.64 | 4.88 | 4.56 | 5.3 | 2.65 | 3.71 | 1.29 |
| CV | | | 226.86 | 165.56 | 135.42 | 102.06 | 134.85 | 172.96 | 150.42 | 387.3 |

a.i. or AI = active ingredient;
ha = hectare;
DA-A + days after application
Different letters beside the data point indicate significant differences at the 0.05 significance level

TABLE 5

Trial comparing formulations of the invention (dithiopyr, isoxaben, 2,4-D, dicamba and MCPP (SLWC + dithiopyr)) to isoxaben (Gallery DF) in pre-emergent control of broadleaf weeds in Kentucky bluegrass

| Treatment | Percent of SLWC | Isoxaben Rate g | Percent Amount of Broadleaf weeds present in Test plots Rating Date: | | | | | | | | | | | | | | | |
|---|---|---|---|---|---|---|---|---|---|---|---|---|---|---|---|---|---|---|
| | | | Mar. 18, 2019 | | Apr. 10, 2019 | | May 6, 2019 | | Jun. 3, 2019 | | Jul. 1, 2019 | | Jul. 15, 2019 | | Jul. 29, 2019 | | Aug. 20, 2019 | |
| | | | Trt-Eval Interval | | | | | | | | | | | | | | | |
| Name | AI's | ai/ha | 6 DA-A | | 29 DA-A | | 55 DA-A | | 83 DA-A | | 111 DA-A | | 125 DA-A | | 139 DA-A | | 161 DA-A | |
| Untreated Check | | | 1 | — | 3 | — | 12.3 | — | 4 | — | 1.7 | — | 1.7 | — | 0 | — | 0 | — |
| SLWC + Dithiopyr (½ SLWC) | 0.5 | 268 | 0.3 | — | 0 | — | 0 | — | 0 | — | 1.7 | — | 0 | — | 0 | — | 0.3 | — |
| SLWC + Dithiopyr (⅓ SLWC) | 0.33 | 179 | 5 | — | 3.3 | — | 8.3 | — | 5 | — | 5 | — | 3.3 | — | 0 | — | 0 | — |
| SLWC + Dithiopyr (⅕ SLWC) | 0.2 | 107 | 1 | — | 0.7 | — | 1.7 | — | 4.3 | — | 4.3 | — | 5.3 | — | 3.3 | — | 3.3 | — |
| Isoxaben (Gallery 75 DF) | 0 | 1130 | 4.3 | — | 5 | — | 14 | — | 9.7 | — | 17.3 | — | 6.3 | — | 7.7 | — | 1.7 | — |
| LSD P = .05 | | | 5.65 | | 4.79 | | 10.5 | | 8.43 | | 18.69 | | 8.71 | | 6.21 | | 3.22 | |
| Standard Deviation | | | 3 | | 2.54 | | 5.58 | | 4.48 | | 9.93 | | 4.63 | | 3.3 | | 1.71 | |
| CV | | | 128.57 | | 105.96 | | 76.72 | | 97.38 | | 165.48 | | 138.83 | | 149.84 | | 160.57 | |

a.i. or AI = active ingredient;
ha = hectare;
DA-A + days after application

TABLE 6

Trial comparing formulations of the invention (dithiopyr, isoxaben, 2,4-D, dicamba and MCPP (SLWC + dithiopyr)) to isoxaben (Gallery DF) in pre-emergent control of broadleaf weeds in Bermuda grass

| Treatment | Percent of SLWC | Isoxaben Rate g | Percent Amount of Broadleaf weeds present in Test plots Rating Date: | | | | | | | | | | | | | | | |
|---|---|---|---|---|---|---|---|---|---|---|---|---|---|---|---|---|---|---|
| | | | Mar. 18, 2019 | | Apr. 10, 2019 | | May 6, 2019 | | Jun. 3, 2019 | | Jul. 1, 2019 | | Jul. 15, 2019 | | Jul. 29, 2019 | | Aug. 20, 2019 | |
| | | | Trt-Eval Interval | | | | | | | | | | | | | | | |
| Name | AI's | ai/ha | 6 DA-A | | 29 DA-A | | 55 DA-A | | 83 DA-A | | 111 DA-A | | 125 DA-A | | 139 DA-A | | 161 DA-A | |
| Untreated Check | | | 11 | — | 25 | a | 18.7 | — | 7.7 | a | 5.3 | — | 4.7 | a | 0 | — | 0 | — |
| SLWC + Dithiopyr (½ SLWC) | 0.5 | 268 | 3.3 | — | 0 | c | 0 | — | 0.3 | b | 0.3 | — | 0 | b | 0.3 | — | 0 | — |
| SLWC + Dithiopyr (⅓ SLWC) | 0.33 | 179 | 4 | — | 0 | c | 5.3 | — | 0.3 | b | 0.3 | — | 0 | b | 0 | — | 0.3 | — |
| SLWC + Dithiopyr (⅕ SLWC) | 0.2 | 107 | 4.3 | — | 0.3 | c | 7.3 | — | 1.7 | b | 1.7 | — | 0 | b | 0 | — | 0 | — |
| Isoxaben (Gallery 75 DF) | 0 | 1144 | 6.3 | — | 8.3 | b | 11 | — | 3.3 | b | 3 | — | 0 | b | 0.7 | — | 0.3 | — |

TABLE 6-continued

Trial comparing formulations of the invention (dithiopyr, isoxaben, 2,4-D, dicamba and MCPP (SLWC + dithiopyr)) to isoxaben (Gallery DF) in pre-emergent control of broadleaf weeds in Bermuda grass

| | | | Percent Amount of Broadleaf weeds present in Test plots Rating Date: | | | | | | | |
|---|---|---|---|---|---|---|---|---|---|---|
| Treatment | Percent of SLWC | Isoxaben Rate g | Mar. 18, 2019 | Apr. 10, 2019 | May 6, 2019 | Jun. 3, 2019 | Jul. 1, 2019 | Jul. 15, 2019 | Jul. 29, 2019 | Aug. 20, 2019 |
| | | | Trt-Eval Interval | | | | | | | |
| Name | AI's | ai/ha | 6 DA-A | 29 DA-A | 55 DA-A | 83 DA-A | 111 DA-A | 125 DA-A | 139 DA-A | 161 DA-A |
| LSD P = .05 | | | 10.95 | 4.57 | 15.81 | 4.17 | 3.93 | 1.75 | 0.97 | 0.6 |
| Standard Deviation | | | 5.82 | 2.43 | 8.4 | 2.21 | 2.09 | 0.93 | 0.52 | 0.32 |
| CV | | | 100.31 | 36.07 | 99.16 | 83.01 | 97.95 | 99.74 | 258.2 | 237.17 |

a.i. or AI = active ingredient;
ha = hectare;
DA-A + days after application
Different letters beside the data point indicate significant differences at the 0.05 significance level The foregoing is illustrative of the present invention and is not to be construed as limiting thereof. The invention is defined by the following claims, with equivalents of the claims to be included therein.

That which is claimed is:

1. An herbicidal mixture comprising:

isoxaben, dithiopyr, 2,4-Dichlorophenoxyacetic acid (2,4-D) and/or an ester, salt and/or choline thereof, 3,6-dichloro-2-methoxybenzoic acid (dicamba) and/or an ester and/or salt thereof, and methylchlorophenoxypropionic acid (Mecoprop or MCPP) and/or an ester and/or salt thereof; wherein the herbicidal mixture comprises about 50% less than the amount of 2,4-D, MCPP, isoxaben, and dicamba in standard herbicidal mixtures and achieves the same herbicidal effect as compared to the standard herbicidal mixtures; and wherein the herbicidal mixture comprises dithiopyr for application in an effective amount of at least about 500 grams/hectare.

2. The herbicidal mixture of claim 1, wherein the herbicidal mixture comprises:

isoxaben in an amount of about 0.02% weight/volume (w/v) to about 25% w/v of the herbicidal mixture;

dithiopyr in an amount of about 0.02% weight/volume (w/v) to about 25% w/v of the herbicidal mixture;

2,4-D in an amount of about 0.01% weight/volume (w/v) to about 35% w/v of the herbicidal mixture;

dicamba in an amount of about 0.001% weight/volume (w/v) to about 10% w/v of the herbicidal mixture; and methylchlorophenoxypropionic acid (Mecoprop or MCPP) in an amount of about 0.005% weight/volume (w/v) to about 10% w/v of the herbicidal mixture.

3. The herbicidal mixture of claim 1, wherein the mixture further comprises a pre-emergent herbicide or a post-emergent herbicide.

4. The herbicidal mixture of claim 3, wherein the post-emergent herbicide is a post-emergent broadleaf herbicide, a post-emergent crabgrass herbicide and/or a post-emergent grass herbicide.

5. The herbicidal mixture of claim 3, wherein the pre-emergent herbicide is atrazine, benefin, bensulide, DCPA, dimethenamid, ethofumesate, florasulam, flumioxazin, indaziflam, metolachlor, oryzalin, oxadiazon, pendimethalin, prodiamine, pronamide, siduron, and/or simazine.

6. The herbicidal mixture of claim 4, wherein the post-emergent broadleaf herbicide is 2,4-DP, amicarbazone, atrazine, bentazon, bispyribac-sodium, bromoxynil, carfentrazone, chlorsulfuron, clopyralid, ethofumesate, flazasulfuron, florasulam, fluroxypyr, glyphosate, halosulfuron, imazapic, imazaquin, imazasulfuron, MCPA, mesitrione, metribuzin, metsulfuron, MSMA, penoxsulam, pyraflufen-ethyl, quinclorac, simazine, sulfentrazone, sulfosulfuron, thiencarbacone, thiencarbazone, topramezone, triclopyr, and/or trifloxysulfuron.

7. The herbicidal mixture of claim 4, wherein the post-emergent crabgrass herbicide is atrazine, auslam, bispyribac-sodium, fenoxaprop, fluorasulam, MSMA, quinclorac, and/or simazine.

8. The herbicidal mixture of claim 4, wherein the post-emergent grass herbicide is bentazon, carfentrazone, chlorsulfuron, clethodim, diflufenzopyr, diquat, fenoxaprop, flazasulfuron, fluazifop, fluoxapyr, foramsulfuron, glufosinate, glyphosate, halosulfuron, imazapyr, imazaquin, imazapic, imazethapyr, indaziflam, iodosulfuron, mesotrione, metribuzin, metsulfuron, MSMA, paraquat, pronamide, quinclorac, risulfuron, sethoxydim, sulfentrazone, topramezone and/or triclopyr.

9. The herbicidal mixture of claim 1, wherein the standard herbicidal mixture comprises a combination of 2,4-D, dicamba, MCPP, and isoxaben.

10. The herbicidal mixture of claim 1, wherein the same herbicidal effect comprises killing the same type of weeds in the same time frame with the same residual control and/or controlling weed seed germination with the same level of residual control.

11. A method of controlling plant growth comprising contacting a plant, plant part, and/or plant environment with an effective amount of the herbicidal mixture of claim 1.

12. The method of claim 11, wherein the plant growth is undesirable plant growth in turf.

13. The method of claim 11, wherein controlling plant growth includes residual control of the plant or plant part.

14. The method of claim 13, wherein the residual control by dithiopyr is increased by about 50%-70% over dithiopyr in the absence of isoxaben, 2, 4-D, dicamba and/or MCPP.

15. The method of claim 11, wherein the plant and/or plant part is a broadleaf plant or from a broadleaf plant.

16. The method of claim 11, wherein the plant or plant part is crabgrass or from crabgrass.

17. The method of claim 16, wherein the crabgrass is mature and comprises at least one tiller.

18. The method of claim 11, wherein the plant or plant part is barley, barnyardgrass, annual bluegrass (*Poa annua*), brome, crabgrass, smooth crabgrass, southern crabgrass, crowfootgrass, dallisgrass, goosegrass, green foxtail, yellow foxtail, marestail, oats, ryegrass, sandbur, sandspur, grassbur, smutgrass, annual yellow sweetclover, aster, Austrian fieldcress, bedstraw, beggarticks, Florida betony, field bindweed, bird vetch, bitter wintercress, hairy bittercress, bitterweed, black-eyed susan, black medic, black mustard, blackseed plantain, blessed thistle, bloodower milkweed, blue lettuce, blue vervain, bracted plantain, brassbuttons, bristly oxtongue, broadleaf dock, broadleaf plantain, broomweed, buckhorn, buckhorn plantain, bulbous buttercup, bull thistle, bullnettle, burclover, burdock, burning nettle, burweed, buttercup, buttonweed, Canada thistle, Carolina geranium, carpetweed, catchweed bedstraw, catnip, catsear, chickweed, common chickweed, mouseear chicory, cinquefoil, clover, crimson clover, hop clover, red clover, strawberry clover, sweet clover, cockle, white cockle, cocklebur, mullein, creeping charlie, creeping jenny, cudweed, curly dock, English daisy, fleabane daisy, oxeye daisy, dandelion, dichondra, dogbane, dogfennel, dollarweed, elderberry, false dandelion, false flax, false sunflower, fiddleneck, Florida pusley, Frenchweed, galinsoga, goathead, goldenrod, ground ivy, gumweed, hairy fleabane, hawkweed, healall, heartleaf drymary, heath aster, hedge bindweed, hedge mustard, hemp, henbit, hoary cress, hoary plantain, hoary vervain, horsenettle, jimsonweed, knawel, knotweed, kochia, lambsquarters, lespedeza, mallow, matchweed, Mexicanweed, milk vetch, morning glory, mouseear hawkweed, mugwort, musk thistle, mustard, narrowleaf plantain, narrowleaf vetch, nettle, orange hawkweed, oriental cocklebur, oxalis, parsleypiert, parsnip, pearlwort, pennycress, pennywort, pepperweed, pigweed, pineywoods bedstraw, plains coreopsis, plantain, poison ivy, poison oak, pokeweed, poorjoe, prairie sunflower, prickly lettuce, prickly sida, prostrate knotweed, prostrate pigweed, prostrate spurge, prostrate vervain, puncturevine, purslane, ragweed, red sorrel, redroot pigweed, redstem filaree, rough cinquefoil, rough fleabane, Russian pigweed, Russian thistle, scarlet pimpernel, scotch thistle, sheep sorrel, shepherdspurse, slender plantain, smallower galinsoga, smooth dock, smooth pigweed, sorrel, sowthistle, spanishneedles, speedwell, spiny amaranth, spiny cocklebur, spiny sowthistle, spotted catsear, spotted spurge, spurweed, stinging nettle, strawberry, Indian strawberry, mock strawberry, tall nettle, tall vervain, tansy mustard, tanweed, thistle, trailing crownvetch, tumble mustard, tumble pigweed, velvetleaf, venice mallow, Virginia buttonweed, Virginia creeper, Virginia pepperweed, water pennywort, wavyleaf bullthistle, western clematis, western salsify, white mustard, wild aster, wild buckwheat, wild carrot, wild four-o'clock, wild garlic, wild geranium, wild lettuce, wild marigold, wild mustard, wild onion, wild parsnip, wild radish, wild rape, wild strawberry, wild sweet potato, wild vetch, woodsorrel, wooly croton, wooly morning glory, wooly plantain, wormseed, yarrow, yellow rocket, yellow pepperweed, ground ivy, wild violet, or any combination thereof.

19. A method of controlling seed germination comprising contacting a plant environment with an effective amount of the herbicidal mixture claim 1.

20. The method of claim 19, wherein the plant environment is turf.

* * * * *